US011879112B2

(12) United States Patent
Acharya et al.

(10) Patent No.: US 11,879,112 B2
(45) Date of Patent: Jan. 23, 2024

(54) FOAM CONTROL INGREDIENT COMPRISING GLYCEROL MONOOLEATE SORBED ON ZEOLITE FOR DETERGENT COMPOSITION

(71) Applicant: Conopco, Inc., Englewood Cliffs, NJ (US)

(72) Inventors: Koushik Acharya, Bangalore (IN); Sujitkumar Suresh Hibare, Bangalore (IN); Panchanan Bhunia, Bangalore (IN)

(73) Assignee: Conopco, Inc., Englewood Cliffs, NJ (US)

( * ) Notice: Subject to any disclaimer, the term of this patent is extended or adjusted under 35 U.S.C. 154(b) by 121 days.

(21) Appl. No.: 16/640,853

(22) PCT Filed: Jul. 16, 2018

(86) PCT No.: PCT/EP2018/069257

§ 371 (c)(1),
(2) Date: Feb. 21, 2020

(87) PCT Pub. No.: WO2019/037952

PCT Pub. Date: Feb. 28, 2019

(65) Prior Publication Data

US 2021/0363466 A1 Nov. 25, 2021

(30) Foreign Application Priority Data

Aug. 24, 2017 (EP) .................................... 17187802

(51) Int. Cl.

| | |
|---|---|
| ***C11D 7/14*** | (2006.01) |
| ***C11D 3/20*** | (2006.01) |
| ***C11D 3/00*** | (2006.01) |
| ***C11D 3/04*** | (2006.01) |
| ***C11D 3/12*** | (2006.01) |
| ***C11D 11/00*** | (2006.01) |
| ***C11D 17/00*** | (2006.01) |
| ***C11D 17/06*** | (2006.01) |

(52) U.S. Cl.

CPC .......... *C11D 3/2093* (2013.01); *C11D 3/0026* (2013.01); *C11D 3/046* (2013.01); *C11D 3/128* (2013.01); *C11D 3/2079* (2013.01); *C11D 11/0017* (2013.01); *C11D 17/0069* (2013.01); *C11D 17/0073* (2013.01); *C11D 17/06* (2013.01)

(58) Field of Classification Search

CPC ..... C11D 3/0026; C11D 3/128; C11D 3/2093; C11D 7/266; C11D 11/0017; C11D 17/0069; C11D 17/0073; C11D 17/041; C11D 17/065

See application file for complete search history.

(56) References Cited

U.S. PATENT DOCUMENTS

| | | | | |
|---|---|---|---|---|
| 4,646,661 | A | 3/1987 | Roos et al. | |
| 5,762,647 | A | 6/1998 | Brown et al. | |
| 6,376,454 | B1 * | 4/2002 | Eggersmann ...... | C11D 17/0039 510/312 |
| 6,686,327 | B1 * | 2/2004 | Schmid ................ | C11D 3/0026 510/224 |
| 7,049,279 | B1 * | 5/2006 | Weuthen .................. | C11D 3/38 510/276 |
| 2003/0027741 | A1 * | 2/2003 | Weuthen ................ | C11D 3/222 510/447 |
| 2005/0245426 | A1 * | 11/2005 | Kischkel ............ | C11D 17/0073 510/446 |
| 2008/0113893 | A1 * | 5/2008 | Rowland .................. | C11D 3/08 510/224 |
| 2008/0188392 | A1 * | 8/2008 | Diamond ............. | C11D 7/5022 510/302 |
| 2014/0352076 | A1 | 12/2014 | Song et al. | |
| 2021/0363466 | A1 | 11/2021 | Acharya et al. | |

FOREIGN PATENT DOCUMENTS

| | | | |
|---|---|---|---|
| EP | 0076558 | | 4/1983 |
| EP | 0200731 | A1 | 11/1986 |
| EP | 0210731 | | 4/1987 |
| EP | 0495345 | | 7/1992 |
| EP | 0496510 | | 7/1992 |
| EP | 0718018 | | 6/1996 |
| EP | 0997180 | | 3/2000 |
| WO | 9504124 | A1 | 2/1995 |
| WO | WO9845395 | | 10/1998 |

(Continued)

OTHER PUBLICATIONS

Examination Report IN; dated Jun. 30, 2021.
Search Report and Written Opinion in PCTEP2018069257.
Search Report and Written Opinion in EP17187802; dated Feb. 13, 2018.
Degussa, Natriumaluminiumsilikat HAB A 40; 1979; 16 pages (machine translation).
Opposition Notice in corresponding European Patent No. EP3673034 dated Jul. 12, 2022 (20 pages).

*Primary Examiner* — Charles I Boyer
(74) *Attorney, Agent, or Firm* — Carter, DeLuca & Farrell LLP; George Likourezos; Bret P. Shapiro

(57) ABSTRACT

The present invention is in the field of fabric cleaning compositions; in particular powder detergent compositions having foaming and cleaning characteristics in the main wash, yet significant foam reduction during rinse. Accordingly the present inventors have investigated ways of improving the defoaming ingredient such that the defoaming ingredient has improving foam-subsiding effects in the rinse stage. However they found that incorporating a monoester of glycerol of unsaturated fatty acids in a cleaning composition has adverse effects on the perfume impact of the cleaning composition. The inventors have found that the disadvantages of the prior art can be overcome, if a monoester of glycerol and unsaturated fatty acid is sorbed by a porous carrier material having a specific pore size and pH ranges. The inventive defoaming ingredient did not masked and/or altered the perfume delivery of the detergent composition.

9 Claims, No Drawings

(56) References Cited

FOREIGN PATENT DOCUMENTS

| | | | |
|---|---|---|---|
| WO | WO2009118329 | | 10/2009 |
| WO | WO2009118349 | | 10/2009 |
| WO | 2012075962 | A1 | 6/2012 |
| WO | WO2012075611 | | 6/2012 |
| WO | WO2013181769 | | 12/2013 |
| WO | WO2015132207 | | 9/2015 |

* cited by examiner

FOAM CONTROL INGREDIENT COMPRISING GLYCEROL MONOOLEATE SORBED ON ZEOLITE FOR DETERGENT COMPOSITION

RELATED APPLICATIONS

This application is a national phase filing under 35 USC 371 of International Application No. PCT/EP2018/069257, filed on Jul. 16, 2018, which claims priority from European Patent Application No. 17187802.8 filed, Aug. 24, 2017, the contents of which are incorporated herein in their entirety for all purposes.

FIELD OF THE INVENTION

The present invention is in the field of fabric cleaning compositions; in particular powder detergent compositions delivering foaming and cleaning characteristics in the main wash, yet providing significant foam reduction during rinse.

BACKGROUND OF THE INVENTION

Water is becoming scarcer, especially in developing countries. As a result, there is need to save water in as many ways as possible.

Laundry detergents having anionic surfactants typically create foam during their use including hand-wash process. Foam is usually associated with cleaning products such as laundry detergent compositions and dishwashing compositions. Products that foam copiously during the pre-rinse cleaning stage, or in other words, the ones, which have greater foaming ability, are perceived to be better than the ones that foam less. Consumers do prefer products that foam copiously. On the other hand, it is also necessary to rinse the articles with clean water so that the foam subsides. During the rinse cycle, consumer tends to associate the presence of foam in the rinse water with the presence of surfactant residue on clothes, and therefore believes that the clothes are not yet "clean". Most consumers tend to rinse until there is no visible sign of foam and usually four to five rinse cycles is the norm. However, such a practice is not sustainable because substantial amount of fresh water is necessary for each rinse cycle. Therefore there is need for compositions which foam copiously during pre-rinse stage, but which could be rinsed off with minimal water.

It has been found that, in fact, fewer rinses can sufficiently remove surfactants and thus multiple rinsing is not necessary. A defoaming ingredient which is selectively active during rinsing can eliminate unwanted excessive foam during rinsing and thus change the consumer's perception of the sufficiency and efficacy of a single rinse, thereby saving water and effort utilized on repeated rinses. Such defoaming ingredient also provides ease of rinsing.

Conventional defoaming agents like silicones and soap are good defoamers but they affect the foam volume during pre-rinse stage. Silicones based antifoams are widely used in detergent compositions and provides ease of rinsing.

Monoglycerides along with the silicone antifoams have been used in detergent compositions to give antifoams benefits as some degree of synergy was observed when used together.

One such disclosure is in EP0210731 A2 (Dow Corning, 1987) which describes a storage stable particulate foam control agent for inclusion in a powder detergent composition comprising silicone antifoam and an organic material having a glycerol monoester. The foam control agent employs a carrier particle which provides a solid basis on which the silicone antifoam and the organic material may be deposited and thus provide a dry basis for the silicone antifoam. These carrier particles may comprise any suitable material but conveniently may be an ingredient or component which is generally part of a detergent composition.

More recently, WO12075962 A1 (Dow Corning) discloses a granulated foam control composition comprising a foam control agent, an organic additive, a hydrophobic filler and a polymer. The organic additive and foam control agent are deposited on a water-soluble particulate inorganic carrier to form the granulated foam control composition. It discloses that insoluble carriers such as zeolites are not suitable. The organic additive increases the foam control efficiency of the composition and the additive has a melting point of at least 45° C. The organic additive may be a polyol ester that is preferably a monoester or diester of glycerol with a carboxylic acid having 8 to 30 carbon atoms. Examples of the diester and monoester includes glycerol monostearate, glycerol monolaurate, glycerol distearate or glycerol monobehanate a combination of monoesters and diesters of glycerols are also disclosed.

Although silicone antifoams are widely used, for use in laundry detergent powders they must be provided in a format that is stable in a highly basic environment of a laundry detergent composition. This requires the silicone antifoams to be encapsulated suitably to protect the silicone antifoam from such environment until it is ready to be used. However, such detergent compositions having silicone as the antifoaming ingredient don't provide any benefits other than defoaming. In addition, the silicone antifoams increase the overall cost of the product. The stability of the silicone antifoams also reduces when the composition is stored over extended period.

In EP0076558 A1 (ICI Plc, 1983) an attempt towards providing alternative antifoaming system is made and discloses a liquid composition for controlling unwanted foam having a combination of mineral and vegetable oils with high surface area solid and surface active compounds. The high surface area solid is a silica and the surface-active compounds includes glycerol monooleate. In this composition, the solid component is dispersed in the liquid composition.

While monoglycerides provide defoaming benefits, but their use in detergent composition is limited. One of the reasons for this which the inventors have found may be because monoglycerides have a bland fatty odor which tend to mask and/or alter the perfume delivery requiring the perfume levels to be up dosed. Perfume being expensive ingredients, any increase in their levels is counterproductive. Further the bland fatty odor becomes intense with storage which further limits the levels at which monoglycerides may be incorporated in detergent compositions.

Therefore, there is an unmet need for defoaming ingredient which have more efficient antifoaming system.

It is an object of the present invention to provide a detergent composition, especially a laundry composition, which provides high foam-volume during the wash or the pre-rinse stage but which requires lesser than the usual number of rinse-cycles for the foam to subside.

It is another object of the present invention to provide a defoaming ingredient for use in a detergent composition, which has a defoaming effect only during rinse while maintaining foaming characteristics in the main wash.

It is yet another object of the present invention to provide a defoaming ingredient for use in a detergent composition, which maintains the perfume delivery and does not tend to mask or alter the perfume impact.

Accordingly, the present inventors have investigated ways of improving the defoaming ingredient such that the defoaming ingredient has improved foam-subsiding effects in the rinse stage. However, they found that incorporating a monoester of glycerol of unsaturated fatty acids in a cleaning composition has adverse effects on the perfume impact of the cleaning composition.

The inventors have surprisingly found that the disadvantages of the prior art can be overcome, and defoaming ingredient which maintains the foaming characteristics in the pre-rinse stage and has a defoaming effect during the rinse stage is attainable if a monoester of glycerol and unsaturated fatty acid is sorbed by a porous carrier material having a specific pore size and pH ranges.

The present inventors have further found that the perfume delivery in detergent composition comprising the inventive defoaming ingredient was not masked and/or altered even in presence of high levels of monoester of glycerol and unsaturated fatty acid. It was further found that presence of defoaming ingredient in cleaning composition lowers the surface tension in the wash stage and caused an increase in the surface tension at the rinse stage thereby contributing towards both cleaning during wash and destabilizing the foam at the rinse stage. It was also found that stability of the defoaming ingredient over time was also enhanced.

SUMMARY OF THE INVENTION

Accordingly, in a first aspect the invention provides a defoaming ingredient for incorporation into a detergent composition, the ingredient comprising a monoester of glycerol and an unsaturated fatty acid sorbed by a porous carrier material having a median pore diameter from $3\times10^{-4}$ micrometers to $5\times10^{-3}$ micrometers and wherein a 1 wt % solution of the porous carrier material in distilled water at a temperature of 25° C. has a pH in the range from 6.5 to 8.5.

In a second aspect, the invention provides a process for preparing a defoaming ingredient comprising the steps of intimately mixing the monoester of glycerol and an unsaturated fatty acid with the porous carrier material to obtain a homogenous mixture.

In a third aspect, the invention provides a detergent composition comprising the defoaming ingredient of the first aspect.

In a fourth aspect, the invention provides use of a defoaming ingredient according to the invention for providing defoaming activity upon rinse.

These and other aspects, features and advantages will become apparent to those of ordinary skill in the art from a reading of the following detailed description and the appended claims. For the avoidance of doubt, any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

DETAILED DESCRIPTION OF THE INVENTION

In a first aspect, the invention relates to a defoaming ingredient comprising a monoester of glycerol and unsaturated fatty acid sorbed by a porous carrier material. As used herein, "sorbed" means held, as by absorption into or adsorption onto, by another substance. In other words, the monoester of glycerol and unsaturated fatty acid may be absorbed into and/or adsorbed onto the porous carrier material.

Defoaming Ingredient

Porous Carrier Material:

The defoaming ingredient of the present invention comprises a porous carrier material.

The porous carrier material of the present invention has micro-pores having a median pore diameter from $3\times10^{-4}$ micrometers to $5\times10^{-3}$ micrometers. Preferably the pore diameter is not less than $3.5\times10^{-4}$ micrometers, still preferably not less than $5\times10^{-4}$ micrometers, still more preferably not less than $7\times10^{-4}$ micrometers but typically not more than $4\times10^{-3}$ micrometers, preferably not more than $2\times10^{-3}$ micrometers or even more preferably not more than $1.5\times10^{-3}$ micrometers. Median pore diameter (pore size) is calculated by BET adsorption isotherm. The method used for determining is according to (ASTM D 3663-03 (2015).

Without wishing to be bound by theory, the inventors believe that the pore diameter ranges ensure effective sorption of monoester of glycerol and unsaturated fatty acids into the porous carrier material, while preventing desorption of monoester of glycerol and unsaturated fatty acids into a detergent composition, when combined therewith during normal storage prior to sale. The pore diameter ranges ensure that the alkaline ingredients in the detergent composition, specifically the smaller particles of alkaline sodium carbonate does not come in direct contact with the monoester of glycerol and unsaturated fatty acid sorbed into the porous carrier material or adsorbed onto a wall of the intraparticle pore surface of the porous carrier material.

In order to provide the necessary sorbing properties for the monoester of glycerol and unsaturated fatty acid, the carrier preferably has a pore volume of at least 0.2 ml/g. More preferably the pore volume of the porous carrier material is in the range from 0.5 to 6 ml/g, preferably at least 0.54 ml/g, more preferably at least 0.8 ml/g, still preferably at least 1 ml/g but typically not more than 5.9 ml/g, preferably 5 ml/g, still preferably not more than 3 ml/g, further preferably not more than 2.5 ml/g and most preferably not more than 2 ml/g.

Porous carrier material of the present invention preferably has a mean particle diameter not exceeding 2000 μm. Preferably the mean particle diameter will be from 80 to 2000 μm. In the context of the present invention particles sizes above 100 microns are determined by sieving, particle sizes below 100 microns are determined by a Malvern 3600 particle analyser.

It is to be understood that the carrier particles can be crystalline structures having a mean particle diameter of from 0.1 to 50 μm. These are generally known as primary particles. Groups of such primary particles become agglomerated to form secondary particles or carrier particles or agglomerates having a mean particle diameter of at least 80 μm as defined above. The inorganic carrier material suitable for use herein are preferably hydrophilic.

Advantageously the porous carrier material has a BET surface area from 150 $m^2/g$ to 500 $m^2/g$. BET surface area is an estimate of the total adsorption area of a nitrogen monolayer adsorption in a porous particle. The procedure, for measuring the BET surface area using nitrogen is well known to those familiar in the art and consists of several steps including (1) placing the porous particles in a glass tube, approximately half full, (2) applying a high vacuum to remove adsorbed species, (3) cooling of the powder sample to approximately 76 Kelvin, (4) evaluating the adsorptive capacity of the powder as a function of the partial pressure of nitrogen injected into the tube. The adsorption data is then organized to yield a total surface area for nitrogen adsorption (monolayer).

The average BET surface area of porous carrier material is from 150 $m^2/g$ to 500 $m^2/g$, more preferably 300 $m^2/g$ to 400 $m^2/g$.

The porous carrier material has a pH in the range from 6.5 to 8.5 when a 1 wt % solution of the porous carrier material in distilled water is measured at a temperature of 25° C. Preferably a 1 wt % solution of the porous carrier material in distilled water at a temperature of 25° C. has a pH in the range from 6.5 to 8. The pH of the porous carrier material is measured by dissolving 1 gram of the selected material in distilled water and making up the solution to 100 mL. The pH of the solution is measured using a calibrated pH meter at a temperature of 25° C.

The porous carrier material is preferably water-insoluble. By the term water insoluble it is meant that the solubility of the carrier material in water is less than 1 g/L at a temperature of 25° C., still preferably less than 0.5 g/L and most preferably less than 0.1 g/L.

Preferred examples of the porous carrier material are commercially available material having the essential pore characteristics and pH in accordance with the first aspect of the present invention. The porous carrier material may be in particulate form preferably a crystalline form. Preferably the porous carrier is an inorganic material selected from the non-limiting list including precipitated calcium carbonate, precipitated silica, crystalline microporous aluminosilicates and dolomite, more preferably the porous carrier material is crystalline microporous aluminosilicates. Preferred crystalline microporous aluminosilicates are zeolites.

In the context of the present invention, zeolites are the preferred porous carrier material. Zeolites, as is commonly known in the art, are crystalline aluminosilicates having fully cross-linked open framework structures built of tetrahedral, corner-sharing $SiO_4$ and $AlO_4$ groups. Zeolites belong to the class of minerals referred to generally as tectosilicates, and their crystalline architecture can be idealized as being constructed from silicon atoms in tetrahedral, four-fold coordination with oxygen atoms in a 3-dimensional lattice. Each silicon atom in the structure has a nominal $4^+$ charge and shares 4 oxygen atoms (each having a nominal charge of $2^-$) with other silicon atoms in the crystal lattice. Substitution of the isoelectronic $Al^{3+}$ for $Si^{4+}$ in the framework creates a charge imbalance on the lattice that must be rectified by the incorporation of additional cations close by Al sites. Steric accommodation of the hydrated cations directs the crystallization of aluminosilicates towards the formation of more open structures containing continuous channels or micropores within the crystal. These structural micropores in the anhydrous zeolites allow the passage and adsorption of molecules based on size giving the materials molecular sieving properties. The structural formula of a zeolite is based on the crystal unit cell, the smallest unit of structure represented by $M_{m/n}[AlO_2)_m(SiO_2)_y]\times H_20$ wherein m/n is the valence of the cation M, x is the number of water molecules per unit cell, m and y are the total number of tetrahedral per unit cell, and y/m is 1 to 100. In a specific embodiment, y/m is from about 1 to about 5. The cation M can be a Group IA and/or Group IIA element, such as sodium, potassium, magnesium, calcium, and mixtures thereof.

Aluminosilicate zeolite materials useful in the practice of this invention are commercially available. Types X and Y zeolites have a nominal pore sizes ranging from about $7.4\times10^{-4}$ micrometers to about $1\times10^{-3}$ micrometres, which is suitable for diffusion of monoester of glycerol and unsaturated fatty acids into the zeolite cavity. Although pore size distribution and silicon to aluminum ratio (hydrophobicity of cavity), cation, and moisture content are critical screening tools for selection among various types of zeolites such as zeolites A, X, Y, etc., there has previously been little guidance criteria for selecting a preferred zeolite from a given type of zeolites e. g. type X, Y or A zeolites, for the present applications. Generally, the preferred zeolites have been Type A or 4A zeolites with a median pore diameter of approximately $4\times10^{-4}$ micrometres. Without wishing to be limited by theory, it is believed that these preferred zeolites provide a channel or cage-like structure in which the monoester of glycerol and unsaturated fatty acid molecules are trapped.

The porous carrier material is present in the defoaming ingredient in a concentration of 10 to 95 wt %, preferably not less than 40 wt %, still preferably not less than 50 wt %, further preferably not less than 55 wt % and most preferably not less than 65 wt %, but typically not more than 90 wt %, still preferably not more than 85 wt % and most preferably not more than 75 wt % of the defoaming ingredient. The porous carrier material for use herein provides the solid basis on which the monoester of glycerol and unsaturated fatty acid is deposited during manufacture; the carrier material must therefore be preferably in the form of solid particles. The porous carrier material are preferably compatible with detergent ingredients, are water-insoluble, water-soluble or water-dispersible to facilitate the dispersion of the monoester of glycerol and unsaturated fatty acid in the aqueous liquor during the wash cycle, and are capable to absorb or adsorb the monoester of glycerol and unsaturated fatty acid, more preferably absorbs the monoester. Preferably the porous carrier material is non-reactive with respect to the monoester of glycerol and unsaturated fatty acid.

Monoester of Glycerol and Unsaturated Fatty Acid:

The defoaming ingredient of the present invention includes a monoester of glycerol and unsaturated fatty acid sorbed by the porous carrier material.

Preferably the unsaturated fatty acid useful in the monoester can include any $C_{18}$ to $C_{24}$ unsaturated fatty acids, branched or unbranched, mono or polymeric fatty acid. Suitable unsaturated fatty acids may have mono-unsaturated, di-unsaturated or polyunsaturated moieties. Non-limiting examples of unsaturated fatty acids include myristoleic acid, palmitoleic acid, sapienic acid, oleic acid, elaidic acid, vaccenic acid, and nervonic acid. Preferably, the unsaturated fatty acid is oleic acid.

Preferably the monoester is glycerol monoleate. Preferably less than 5 wt % of the monoester in the disclosed defoaming ingredient is in its salt form, more preferably less than 3 wt %, still preferably less than 1 wt % of the monoester of unsaturated fatty acids is in the salt form and most preferably all of the fatty acids in the monoester of unsaturated fatty acids and glycerol is in the acid form. Preferred glycerol monooleate includes commercially available grade which includes Fynol DGO ex Fine Organics, Monomuls® 90-O 18 ex BASF and Capmul® GMO-50 EP/NF ex Abitec Corporation.

It is not essential that the glycerol monooleate or other monoester of glycerol and unsaturated fatty acids be pure compounds. Impure commercial products obtained by customary methods of manufacture are satisfactory. The commercially available glycerol mono-oleate includes mixtures of mono, di- and triglycerides. Preferably, the content of the glycerol mono-oleate in the commercial product is at least 65 wt %, at least 75 wt %, at least 80 wt %, at least 85 wt %, at least 95 wt % and most preferably at least 98 wt % or more. Commercially available glycerol oleate that is a mixture of mono and dioleate obtained by alcoholizing various fatty oils such as castor oil, dehydrated castor oil, coconut oil, corn oil, cottonseed oil, linseed oil, oiticica oil, olive oil, palm oil, peanut oil, perilla oil, safflower oil, sardine oil, soybean oil, tallow, tung oil, olive oil with glycerol are suitable. It is highly preferred that the monoester of glycerol and unsaturated fatty acids contains at least 80 wt % of the monoester, still preferably at least 90 wt % of the monoester, further preferably at least 95 wt % of the monoester.

The commercial grade of the glycerol mono-oleate may include monoester of a saturated fatty acid with glycerol. Generally, the content of such monoester of saturated fatty acids is less than 35 wt %, more preferably less than 30 wt %, still more preferably less than 5 wt % and still preferably less than 1 wt % of the monoester of saturated fatty acids.

The monoester of glycerol and an unsaturated fatty acid is present in the defoaming ingredient in a concentration of 2 wt % to 30 wt %, preferably at least 4 wt %, more preferably at least 8 wt % but typically not more than 26 wt %, preferably not more than 25 wt %, still preferably not more than 20 wt %, further preferably not more than 18 wt % of the defoaming ingredient.

The monoester of unsaturated fatty acids and glycerol forms soap in the rinse stage having a weight average particle size from 1 to 10 micrometers.

Particularly suitable are those monoester of glycerol and unsaturated fatty acids that are at least to some extent water dispersible. The monoester according to the present invention is predominantly entrapped within the pore of the carrier material, it is believed that the small pore size ensures not only that the monoester is retained strongly during transit and storage, but that when it is slowly released into the wash liquor and advantageously released in the rinse water it is in the form of especially small particles or droplets.

Flow Aid:

Flow properties of the defoaming ingredient may be improved preferably by adding a flow aid. Preferred flow aid is silica, more preferably precipitated silica which when present in the composition is at a concentration from 0.1 to 6 wt %, more preferably from 0.1 to 4 wt % and still preferably from 0.1 to 2.5 wt %. The amount of precipitated silica in the defoaming ingredient is preferably not more than 6 wt % as higher levels of silica present difficulty in handling owning to its dusty nature and low bulk density.

Bulking Agent:

Preferably the defoaming ingredient according to the present invention may comprise a bulking agent. Without wishing to be bound by theory, a bulking agent is a material used in defoaming ingredient that is separate to the porous carrier material having the monoester and serves a purpose other than providing defoaming benefit. For example, a bulking agent may help achieve a desired bulk density of the defoaming ingredient for incorporation into a detergent composition. Those skilled in the art will recognize suitable bulking agents. Non-limiting examples of the bulking agent includes a material selected from chlorides, silicate, sulphate, silica, or a mixture thereof.

When present, the bulking agent is present in the defoaming ingredient in a concentration of 1 to 94%, preferably at least 10%, more preferably at least 20%, still more preferably at least 35%, even more preferably at least 45% but typically not more than 90%, preferably not more than 80%, more preferably not more than 70%, still more preferably not more than 60% by weight of the defoaming ingredient.

Process for Preparing the Defoaming Ingredient

In a second aspect, the invention provides a process for preparing the defoaming ingredient comprising the steps of intimately mixing the monoester of glycerol and an unsaturated fatty acid with the porous carrier material to obtain a homogenous mixture.

The porous carrier material and the monoester of glycerol and unsaturated fatty acids is carried out in a high shear mixer, preferred high shear mixer includes plough shear mixer and sigma mixer. The monoester of glycerol and unsaturated fatty acid added into the mixer containing the porous carrier material with continuous mixing, preferably the monoester of glycerol and unsaturated fatty acid is sprayed on the porous carrier material along with continuous mixing in the high shear mixer. During the mixing, the temperature raises due to the agitation. Granulation is preferably the next step, and the obtained defoaming ingredient is optionally cooled to room temperature in a fluid bed. The monoester of glycerol and unsaturated fatty acid is preferably heated to a temperature just above its melting point before the mixing preferably the temperature is around 36° C. to 38° C.

The monoester absorbed into the porous carrier material are preferably added at levels below the theoretical maximum absorption capacity of the carrier consisting of pores having a median pore diameter of $3\times10^{-4}$ micrometers to $5\times10^{-3}$ micrometers. Preferably the ratio by weight of carrier to monoester is less than 25:1, more preferably between 12:1 and 1:1 e.g. 10:1 or 1.5:1. The level of addition of monoester should be chosen to preferably give free flowing particles.

Detergent Composition

In a third aspect, the invention relates to a detergent composition including a defoaming ingredient according to the first aspect of the invention.

Defoaming ingredient when utilized in a detergent composition are preferably present in a "foam suppressing amount". By "foam suppressing amount" is meant that the formulator of the composition can select an amount of this defoaming ingredient that will sufficiently control the foam to result in a low-foaming laundry detergent for use in automatic laundry washing machines or provide easy of rinsing when used for hand washing.

The detergent composition herein will have a defoaming ingredient according to the invention in a concentration from 0.3 wt % to about 10 wt % of detergent composition. This upper limit is practical in nature, due primarily to concern with keeping costs minimized and effectiveness of lower amounts for effectively controlling sudsing. The defoaming ingredient is present in the detergent composition in a concentration preferably not less than 0.3%, more preferably not less than 1%, still more preferably not less than 1.5% but typically not more than 10%, preferably not more than 7% or even not more than 5% by weight of the detergent composition.

Surfactant:

One of the key ingredients in a detergent composition is the surfactant.

The detergent composition of the invention comprises an anionic surfactant or a mixture of anionic surfactants. Anionic surfactants are included in the composition for primary cleaning action by emulsifying the oil attached to the substrate. Any non-soap anionic surfactant known in the art for use in laundry detergents may be used herein. In general, these surfactants are described in well known textbooks like "Surface Active Agents" Vol. 1, by Schwartz & Perry, lnterscience 1949, Vol. 2 by Schwartz, Perry & Berch, Interscience 1958, and/or the current edition of "McCutcheon's Emulsifiers and Detergents" published by Manufacturing Confectioners Company or in "Tenside-Taschenbuch", H. Stache, 2nd Edn., Carl Hauser Verlag, 1981.

A suitable class of anionic surfactants are water-soluble salts, particularly alkali metal (eg. sodium or potassium), ammonium and alkylolammonium salts of organic sulphuric acid mono-esters and sulphonic acids having in the molecular structure a branched or straight chain alkyl group and condensations products thereof containing 8 to 22 carbon atoms or an alkylaryl group containing 6 to 20 carbon atoms in the alkyl part.

Preferred anionic surfactants include higher alkyl aromatic sulphonates such as higher alkyl benzene sulphonates containing from 6 to 20 carbon atoms in the alkyl group in a straight or branched chain, particular examples of which are higher alkyl benzene sulphonates or of higher-alkyl toluene, xylene or phenol sulphonates, alkyl naphthalene sulphonates, diamyl naphthalene sulphonate, and dinonyl naphthalene sulphonate; alkyl sulphates containing 8 to 22 carbon atoms and alkyl ether sulphates containing from 1 to 10 ethylene oxide or propylene oxide, preferably 2 to 3 ethylene oxide units per molecule.

Non-limiting examples of the anionic surfactants include any of the common anionic surfactants such as linear or modified, e. g., branched alkylbenzene sulphonates, alkylpoly(ethoxylates), sodium lauryl ether sulphates, methyl ester sulphonates, primary alkyl sulphates or mixtures thereof.

The non-soap anionic surfactant is present in the detergent composition in a concentration of 5 to 60%, preferably not less than 10%, more preferably not less than 12%, still more preferably not less than 15% but typically not more than 40%, preferably not more than 35% or even not more than 30% by weight of the total composition.

Anionic surfactant of the present invention may be combined with another surfactant generally chosen from nonionic, cationic, amphoteric or zwitterionic surfactants.

In view of the anionic character of the anionic surfactant, cationic, amphoteric or zwitterionic surfactants when added are added at concentrations that do not hinder the performance of the composition. Suitable non-ionic surfactants include water soluble aliphatic ethoxylated nonionic surfactants commercially known, including the primary aliphatic alcohol ethoxylates and secondary aliphatic alcohol ethoxylates. This includes the condensation products of a higher alcohol (e.g., an alkanol containing about 8 to 16 carbon atoms in a straight or branched chain configuration) condensed with about 4 to 20 moles of ethylene oxide, for example, lauryl or myristyl alcohol condensed with about 10 moles of ethylene oxide (EO), tridecanol condensed with about 6 to 15 moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 1 1 EO per mole of alcohol.

Examples of the foregoing nonionic surfactants include, but are not limited to, the Neodol (trade mark, ex Shell) ethoxylates, which are higher aliphatic, primary alcohol containing about 9 to 15 carbon atoms, such as C9 to C11 alkanol condensed with 4 to 10 moles of ethylene oxide (Neodol 91-8 or Neodol 91-5), C12-13 alkanol condensed with 6.5 moles ethylene oxide (Neodol 23-6.5), C12-15 alkanol condensed with 12 moles ethylene oxide (Neodol 25-12), C14-15 alkanol condensed with 13 moles ethylene oxide (Neodol 45-13), and the like. Such ethoxamers have an HLB (hydrophobic lipophilic balance) value of about 8 to 15 and give good O/W emulsification, whereas ethoxamers with HLB values below 7 contain less than 4 ethyleneoxide groups and tend to be poor emulsifiers and poor detergents. Suitable amphoteric surfactants include derivatives of aliphatic secondary and tertiary amines containing an alkyl group of 8 to 18 carbon atoms and an aliphatic radical substituted by an anionic water-solubilizing group, such as sodium 3-dodecylamino-propionate, sodium 3-dodecylaminopropane sulphonate and sodium N-2-hydroxydodecyl-N-methyltaurate.

Suitable cationic surfactants are quaternary ammonium salts according to the present invention are quaternary ammonium salts characterised in that the ammonium salt has the general formula: $R_1R_2R_3R_4N^+X^-$ wherein $R_1$ is a $C_{12}$ to $C_{18}$ alkyl group, each of $R_2$, $R_3$ and $R_4$ independently is a $C_1$ to $C_3$ alkyl group and X is an inorganic anion. $R_1$ is preferably a $C_{14}$ to $C_{16}$ straight chain alkyl group, more preferably $C_{16}$. $R_2$-$R_4$ are preferably methyl groups. The inorganic anion is preferably chosen from halide, sulphate, bisulphate or $OH^-$. Thus, for the purposes of this invention, a quaternary ammonium hydroxide is considered to be a quaternary ammonium salt. More preferably the anion is a halide ion or sulphate, most preferably a chloride or sulphate. Cetyl-trimethylammonium chloride is a specific example of a suitable compound and commercially abundantly available.

Another type of quaternary ammonium cationic surfactant is the class of benzalkonium halides, also known as alkyldimethylbenzylammonium halides. The most common type being benzalkonium chloride, also known as alkyldimethylbenzylammonium chloride (or ADBAC).

Suitable zwitterionic surfactants include derivatives of aliphatic quaternary ammonium, sulphonium and phosphonium compounds having an aliphatic radical of from 8 to 18 carbon atoms and an aliphatic radical substituted by an anionic water-solubilising group, for instance 3-(N—N-dimethyl-N-hexadecylammonium) propane-1-sulphonate betaine, 3-(dodecylmethyl sulphonium) propane-1-sulphonate betaine and 3-(cetylmethylphosphonium) ethane sulphonate betaine.

When present in the composition, the additional surfactant replaces 0.5 to 15% by weight, preferably 5 to 10% by weight of the anionic surfactant.

Optional Ingredients:

The composition according to the invention may contain other ingredients which aid in the cleaning or sensory performance. Compositions according to the invention can also contain, in addition to the ingredients already mentioned, various other optional ingredients such as bleaching agents, such as sodium perborate and percarbonate, bleach activators, anti redeposition agents such as carboxymethyl cellulase, enzymes, brighteners, fabric softening clays, perfumes, dyes, pigments, colorants, preservatives, polymers, anti-microbial agents, pH adjusters, sequesterants and alkalinity agents and hydrotropes.

Builder:

The detergent compositions herein preferably also contain a builder, which is preferably a non-phosphate species; accordingly, the builder herein preferably is selected from aluminosilicate ion exchangers (zeolites), and water-soluble monomeric or oligomeric carboxylate chelating agents such as citrates, succinates, oxydisuccinates, as well as mixtures of the above species. Other suitable builder materials include alkali metal carbonates, bicarbonates and silicates, organic phosphonates, amino polyalkylene phosphonates and amino polycarboxylates, ethylene diamine tetraacetic acid and nitrilotriacetic acid. Other suitable water-soluble organic salts are the homo- or co-polymeric polycarboxylic acids or their salts in which the polycarboxylic acid comprises at least two carboxyl radicals separated from each other by not more than two carbon atoms. Examples of such salts are polyacrylates of MW 2000 to 5000 and their copolymers with maleic anhydride, such copolymers having a molecular weight of from 20,000 to 70,000, especially about 40,000.

The builder in the detergent composition according to the present invention is present in a concentration from 1% to 90%, preferably 5% to 75%, still preferably 10% to 55% by weight of the detergent composition.

The composition of the invention preferably includes alkali metal, preferably sodium, carbonate. Sodium carbonate may suitably be present in amounts ranging from 1 to 60 wt % preferably from 10 to 55 wt % of the detergent composition.

In a fourth aspect, the invention relates to use of a defoaming ingredient according to the invention for providing foam subsiding activity upon rinse.

The invention will now be illustrated by means of the following non-limiting examples.

EXAMPLES

Example 1: Preparation of the Defoaming Ingredient

A defoaming ingredient according to the present invention was produced by weighing the components of the defoaming ingredient which includes the glycerol monoleate, porous carrier material (zeolite 4A), flow aid (precipitated silica) and a bulking agent (sodium sulphate) in specific amounts as disclosed in Table 1. The weighed zeolite is first mixed with half of the glycerol monooleate for 30 seconds in a sigma mixer. Then half of the weighed precipitated silica and the remaining portion of the glycerol monoleate is added to the mixer and mixed for another 30 seconds. Thereafter the weighed sodium sulphate is added to the mixture and mixed for 30 seconds followed by the addition of remaining portion of precipitated silica to obtain the defoaming ingredient (Ex 1).

Storage Stability of the Defoaming Ingredient:

For studying the storage stability of the defoaming ingredient according to the present invention (Ex 1), around 200 g of the prepared batch was packed in a PET-PE laminate and sealed. The sealed pouches were then stored at a temperature of 40° C. and 85% relative humidity for a period of 4 weeks, 10 weeks and 16 weeks. The content of glycerol monooleate was measured at regular intervals and the measured values are provided in Table 1.

Comparative defoaming ingredient (Ex A) was prepared similar to the defoaming ingredient according to the present invention (Ex 1) except that the porous carrier material in the comparative example was porous sodium carbonate instead of zeolite.

Measurement of Glycerol Monooleate in the Defoaming Ingredient:

3 grams of the prepared defoaming ingredient was weighed in a 50 mL tarson tube. To this sample 10 grams of carbon tetrachloride was added and thoroughly mixed in vortex mixer for 10 minutes. The solution was thereafter centrifuged at 7000 rpm and 25° C. for 20 minutes. The GMO is then analysed in solvent phase Infra Red spectroscopy method.

TABLE 1

| Ingredients | Ex 1 amount present in the defoaming ingredient (wt %) | Ex A amount present in the defoaming ingredient (wt %) |
|---|---|---|
| Monoester of glycerol and unsaturated fatty acid (Glycerol monooleate)* | 8 | 8 |
| Porous carrier material according to the present invention (Zeolite 4A) | 71.75 | 0 |
| Comparative carrier material (Sodium carbonate) | 0 | 71.75 |
| Bulking agent (Sodium sulphate) | 20 | 20 |
| Flow aid (precipitated silica) | 0.25 | 0.25 |
| Amount of glycerol monooleate present in the defoaming ingredient stored at 40° C. and 85% RH | | |
| At start of study | 8.0 | 8.0 |
| After 4 weeks of storage | 1.58 | 8.0 |
| After 10 weeks of storage | 0.35 | 8.0 |
| After 16 weeks of storage | 0.05 | 8.0 |

*Fynol DGO ex Fine organics with 65 wt % glycerol monooleate

The data in table 1 indicates that a defoaming ingredient according to the present invention (Ex 1) is available in active form even after 16 weeks of storage at room temperature as compared to the comparative defoaming ingredient (Ex A) which degrades over storage.

Example 2: Effect of Different Fatty Acid Esters on Foam Volume

This example demonstrates the effect of the presence of different monoesters on the volume of foam generated in the initial wash and the antifoaming effect during the rinse. The wash liquor of Ex 2 having glycerol monooleate are compared with comparative wash liquor Ex B and Ex C comprising the monoester of glycerol and stearic acid (18:0) which is a monoester of glycerol and a saturated fatty acid.

Preparation of Model Wash Liquor:

A 0.6 gpl NaLAS containing model wash liquor was prepared in the following manner. 940 mL of distilled water was taken and to this 0.235 grams of calcium chloride, 0.1625 grams of magnesium chloride was added and dissolved by continuous stirring to obtain a hard water with 24FH hardness. To this 24FH hard water, 60 mL of 10 gpl NaLAS solution and 1 gram of sodium carbonate and 0.38 grams of sodium sulphate was added to obtain the model wash liquor and used for conducting the foam volume study.

Defoaming ingredient (Ex 1) according to the present invention was used for the foam volume study. A comparative defoaming ingredient (Ex B) was prepared in the similar manner as Ex 1 except that glycerol monostearate was used instead of glycerol monoleate.

The different defoaming ingredient were added to at various concentrations to the model wash liquor to obtain several wash liquors. The initial foam volume and the final foam volume of these wash liquors was measured and provided in Table 2. The wash liquor prepared were:

a) Control: The above described model wash liquor was taken as the control.
b) Comparative wash liquor (Ex C) with 1 wt % glycerol monostearate (GMS): This was prepared by taking 1 litre of the above described model wash liquor and adding 0.375 grams of the defoaming ingredient (Ex B) with 8 wt % glycerol monostearate to it.
c) Comparative wash liquor (Ex D) with 1.5 wt % glycerol monostearate (GMS): This was prepared by taking 1 litre of the above described model wash liquor and adding 0.56 grams of the defoaming ingredient (Ex B) with 8 wt % glycerol monostearate to it.
d) Wash liquor according to the invention (Ex 2) with 1 wt % glycerol monooleate (GMS): This was prepared by taking 1 litre of the above described model wash liquor and adding 0.375 grams of the defoaming ingredient (Ex 1) with 8 wt % glycerol monooleate to it.

Procedure for Measurement of Foam Volume:

For the measurement of foam volume, standard cylinder shake method was used. 40 mL of the above-mentioned wash liquors with the defoaming ingredient was taken in a 250 mL graduated glass cylinder. The liquor was shaken by covering the opening of the cylinder and inverting it 20 times. Then the cylinder was placed on a flat surface of a table for 1 minute for the aqueous layer to separate and it was shaken once again to even out the foam level. The volume of foam (excluding aliquote water), in mL was measured and recorded as the initial foam volume.

To measure the amount of foam generated in the rinse cycle, the model wash liquor mentioned above was first diluted 10 times. The dilution was carried out by adding 36 mL water of 24FH hardness to 4 ml of the wash liquor, the water was added along the sides of the cylinder and the solution formed was shaked and the foam volume measured as previously for the initial foam measurement.

TABLE 2

| Set | Initial foam volume (ml) | Foam volume after first rinse (in 10 time diluted liquor, ml) |
|---|---|---|
| Control | 180 ± 10 | 32 ± 2 |
| Ex 2 | 175 ± 5 | 13 ± 3 |
| Ex C | 175 ± 2 | 30 ± 1 |
| Ex D | 160 ± 1 | 22 ± 2 |

The data in the table 2 shows that in the example according to the present invention having a defoaming ingredient with glycerol monoleate initially the foam height is comparable with the control which is desired at the pre-rinse stage and at the same time the foam volume is reduced by around 20 mL in the first rinse. As compared to this the comparative example shows significantly lower foam reduction in the first rinse (Ex C) at the same levels of addition. Comparative Ex D with increased levels of the glycerol monostearate in the defoaming ingredient shows an improvement in foam reduction in the rinse stage but adversely affect the foam volume in the pre-rinse stage. The table thus demonstrates that best results for initial foam and defoaming effect during rinse are obtained with monoesters having unsaturated fatty acid within the scope of the present invention which performs better than a monoester having saturated fatty acid.

Example 3: Effect of the Addition of the Defoaming Ingredient on the Perfume Impact of the Detergent Composition A panel test on the perfume impact was conducted with 7 trained panelists. The panelists were given different samples as provided in the table 3 below. The panelists scored the samples on a 10 point scale where a score of 0 indicates no smell and a highest score of 10 indicates bad smell. The average score for each sample is given in Table 3.

TABLE 3

| Sample | Average score |
|---|---|
| Neat glycerol monoleate | 8.7 |
| Glycerol monoleate sorbed on sodium carbonate (Ex A) | 7.0 |
| Glycerol monoleate sorbed on zeolite (Ex 1) | 2.9 |

The table above shows that sorbing the glycerol monooleate on a porous carrier material according to the present invention significantly reduced the smell as compared to the comparative example (Ex A) having sodium carbonate as the porous carrier material.

Example 4: Effect of the Defoaming Ingredient on the Surface Tension

This example demonstrates the effect of the defoaming ingredient according to the present invention on the surface tension of the surfactant system in detergent compositions.

Materials:

NaLAS stock solution: The stock solution was prepared by dissolving around 148 grams of LAS acid in distilled water and then neutralising it with 48% sodium hydroxide solution. The pH of the stock solution was maintained at 8 to 8.5. The anionic surfactant content measured by standard hyamine titration was determined to be 156 gpl.

Diluted stock solution: A 10 gpl NaLAS solution was prepared by adding 32.05 ml of the 156 gpl NaLAS stock solution in a 500 ml conical flask and the volume was made up with distilled water. Thus obtained 10 gpl NaLAS solution was used for preparing the wash liquor.

Equilibrium Surface Tension Determination:

The equilibrium surface tension of the surfactant system was acquired by means of Wilhlmely plate method in Kruss tensiometer (K12). Before starting the experiment, the instrument was calibrated with ultrapure water. The temperature was maintained at 25° C. with the help of a thermostat.

Wilhemly Plate Method:

A thin platinum plate is used as a probe. The plate is oriented perpendicular to the air water interface. To ensure perfect wetting, the plate was cleaned and flamed before the experiment. When immersed, the surfactant solution adheres on to the platinum plate due to surface tension acting along the perimeter of the plate, increasing the surface area and leading to a force tending to pull the probe toward the plane of the surface. The force applied to the plate is equal to the weight of the liquid meniscus uplifted over the horizontal surface. This force is measured using microbalance, and the surface tension is calculated using the equation, $$\gamma = \frac{F}{P\cos\theta}$$

Where,

γ—Surface Tension.

θ—Contact angle measured for the liquid meniscus.

P—Perimeter of the platinum plate, P=2(L+t).

F—Force applied for uplifting the plate.

Contact angle here is assumed as zero owing to the high surface energy of platinum.

Preparation of Wash Liquor

To avoid any impurity coming from other ingredient in a detergent composition, a model system was prepared to determine air-water interface surface tension.

To make a model wash liquor of 0.7 gpl NaLAS solution, around 17.5 ml of the diluted stock solution (10 gpl NaLAS) was taken in a 250 ml graduated volumetric flask and the volume was made up to 250 ml using distilled water. To this 0.375 grams of sodium carbonate and 0.4675 grams of sodium chloride was added to obtain the model wash liquor. This model wash liquor was also used as the control.

A wash liquor according to the present invention was prepared by taking approximately 16.25 ml of the diluted stock solution (10 gpl NaLAS) in a 250 ml graduated volumetric flask and then the volume was made up to 250 ml using distilled water. To this 0.375 grams of sodium carbonate and 0.4675 grams of sodium chloride was added. Thereafter around 0.1 grams of the defoaming ingredient according to Ex 1 was added to obtain the wash liquor according to present invention having around 1 v/v % glycerol monooleate and 0.65 gpl NaLAS.

A wash liquor according to the present invention was prepared by taking around 16.87 ml of the diluted stock solution (10 gpl NaLAS) in a 250 ml graduated volumetric flask and then the volume was made up to 250 ml using distilled water. To this 0.375 grams of sodium carbonate and 0.4675 grams of sodium chloride was added. Thereafter around 0.14 grams of the defoaming ingredient according to Ex 1 was added to obtain the wash liquor according to present invention having around 0.5 v/v % glycerol monooleate and 0.675 gpl NaLAS.

All the above wash liquor samples were taken in Kruss tensiometer for measuring the surface tension. 7 points were measured in 30 minutes to get the equilibrium data. The average equilibrium surface tension is provided in Table 4.

TABLE 4

| Wash liquor samples | Avg. eq. ST(mN/m) |
|---|---|
| Control (0.7 gpl NaLaS) | 29.83 |
| Ex 3 (0.65 gpl NaLaS and 1 v/v % glycerol monooleate) | 28.56 |
| Ex 4 LAS (0.675 gpl NaLaS and 1 v/v % glycerol monooleate) | 28.74 |

In the table 4, the wash liquor according to the present invention having the defoaming ingredient (Ex 3, Ex 4) with glycerol monooleate lowers the surface tension of the system as compared to control.

The invention claimed is:

1. A detergent composition ingredient for providing foaming and cleaning performance in a main wash cycle and having significant foam reduction during a rinse cycle, the detergent composition ingredient comprising:

A) glycerol monooleate;

B) a 4A Zeolite with a median pore diameter of approximately $4\times10^{-4}$ micrometers, wherein a 1 wt % solution of the Zeolite 4A in distilled water at a temperature of 25° C. has a pH in the range from 6.5 to 8.5, and wherein the glycerol monooleate is sorbed within the Zeolite 4A.

2. The detergent composition ingredient according to claim 1 further comprising 20 to 80 wt % of a bulking agent.

3. The detergent composition ingredient according to claim 2 wherein the bulking agent is a sulphate or chloride salt of alkali metal or alkali earth metal.

4. The detergent composition ingredient according to claim 1 further comprising a flow aid.

5. The detergent composition ingredient according to claim 4 wherein the flow aid is silica.

6. The detergent composition ingredient according to claim 1 comprising from 4 wt % to 30 wt % of the glycerol monooleate.

7. A process for preparing the ingredient according to claim 1 comprising steps of intimately mixing the glycerol monooleate with the Zeolite 4A to obtain a homogenous mixture.

8. A detergent composition comprising the detergent composition ingredient according to claim 1.

9. The detergent composition of claim 8 wherein the detergent composition is selected from a powder, tablet, bar or particulate form.

* * * * *